United States Patent
Oh et al.

(10) Patent No.: US 9,604,562 B2
(45) Date of Patent: Mar. 28, 2017

(54) HEATING AND COOLING CUP HOLDER

(71) Applicants: Hyundai Motor Company, Seoul (KR); KBAUTOTECH CO., LTD., Asan-si (KR)

(72) Inventors: Man Ju Oh, Yongin-si (KR); Jae Woong Kim, Hwaseong-si (KR); Jae Woo Park, Ansan-si (KR); Jae Hoon Kim, Cheonan-si (KR)

(73) Assignees: Hyundai Motor Company, Seoul (KR); KBAUTOTECH CO., LTD., Asan-si (KR)

(*) Notice: Subject to any disclaimer, the term of this patent is extended or adjusted under 35 U.S.C. 154(b) by 377 days.

(21) Appl. No.: 14/278,838

(22) Filed: May 15, 2014

(65) Prior Publication Data

US 2015/0107269 A1 Apr. 23, 2015

(30) Foreign Application Priority Data

Oct. 17, 2013 (KR) .................. 10-2013-0123954

(51) Int. Cl.
*F25B 21/02* (2006.01)
*B60N 3/10* (2006.01)

(52) U.S. Cl.
CPC ............ *B60N 3/104* (2013.01); *B60N 3/101* (2013.01)

(58) Field of Classification Search
CPC ......... B60N 3/104; B60N 3/101; F25B 21/04; F25B 2321/02; A47G 19/2288; B60H 1/00478
USPC .................................. 62/3.2, 3.3, 3.6, 3.64
See application file for complete search history.

(56) References Cited

U.S. PATENT DOCUMENTS

| 5,720,171 A | 2/1998 | Osterhoff et al. |
| 6,282,906 B1 * | 9/2001 | Cauchy ................ B60N 2/4686 62/244 |

FOREIGN PATENT DOCUMENTS

| KR | 2000-0000153 A | 1/2000 |
| KR | 20-0181246 Y1 | 5/2000 |
| KR | 10-2006-0114593 A | 11/2006 |
| KR | 10-2007-0069058 A | 7/2007 |
| KR | 10-2013-0000157 A | 1/2013 |
| KR | 10-2013-0017655 A | 2/2013 |
| KR | 10-2013-0058094 A | 6/2013 |
| KR | 10-2013-0074934 A | 7/2013 |

* cited by examiner

*Primary Examiner* — Len Tran
*Assistant Examiner* — Ana Vazquez
(74) *Attorney, Agent, or Firm* — Morgan, Lewis & Bockius LLP

(57) ABSTRACT

A heating and cooling cup holder includes: a holder body to store a beverage container, a shape enclosing the beverage container, and a blowing hole to which wind is introduced; a heat exchanger having a front coupled to an outer side of the holder body to cover the blowing hole and an inlet to thereby allow the wind introduced into the inlet to be heat-exchanged and then discharged into the holder body through the blowing hole; a Peltier element having a front coupled to a rear surface of the heat exchanger and a heat pipe having a front of one end portion coupled to a rear surface of the Peltier element and the other end portion extended to a side direction; and a radiating module coupled to one end portion of the heat pipe and a radiating fan arranged at a rear of the radiating module.

11 Claims, 6 Drawing Sheets

HEATING AND COOLING CUP HOLDER

CROSS REFERENCE TO RELATED APPLICATION

The present application claims priority of Korean Patent Application Number 10-2013-0123954 filed Oct. 17, 2013, the entire contents of which application is incorporated herein for all purposes by this reference.

BACKGROUND OF INVENTION

Field of Invention

The present invention relates to a heating and cooling cup holder capable of increasing convenience for a user by improving rapid action property and performance, and also increasing marketability because a beverage may be cooled or heated in a short time to drink in a car.

Description of Related Art

A cup holder has been provided with a vehicle, and the like. This cup holder generally possesses only a simple pick-up function, but a cup holder with heating and cooling functions in addition to the hold function has been suggested according to some car models.

However, the cup holder according to the related art generally handles the heating and cooling functions simply using heat conduction, but may not sufficiently perform the heating and cooling functions only using the heat conduction.

The cup holder according to the related art uses a Peltier element, but has handled the heating and cooling functions of a cup stored therein by only performing a heat transfer to a body of the cup holder by conduction.

However, according to the above mentioned technology, the heating and cooling functions according to the heat conduction may not be properly performed in the case in which a contact area between the cup and the cup holder is small. That is, sizes of the cup and the cup holder do not always match, there is a case in which a bottom surface of the cup is dented, and in a case of a paper cup made of paper having low heat conductivity, the heat transfer is hardly generated according to the conduction, such that a temperature of the cup tends to match a surrounding temperature.

Therefore, a cup holder capable of properly implementing the substantial heating and cooling functions by solving the above mentioned problems has been demanded.

In addition, the cup holder is also described in U.S. Pat. No. 5,720,171 entitled "Device for Heating and Cooling a Beverage", but since this cup holder also implements the heating and cooling functions of the cup holder by only conduction, efficiency of the substantial heating and cooling functions may be very low.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a heating and cooling cup holder capable of increasing convenience for a user by improving rapid action property and performance, and also increasing marketability because a beverage may be cooled or heated in a short time to drink in a car.

According to various aspects of the present invention, there is provided a heating and cooling cup holder, including: a holder body having a top opened to store a beverage, a shape enclosing the beverage, and a blowing hole to which wind is introduced, formed at a side thereof; a heat exchanger having a front or inner surface coupled to an outer side of the holder body so as to cover the blowing hole, that is, having a front or inner surface mounted at the blowing hole, and an inlet formed at one side thereof to thereby allow the wind introduced into the inlet to be heat-exchanged and to be then discharged into the holder body through the blowing hole; a Peltier element having a front coupled to a rear surface of the heat exchanger and a heat pipe having a front of one end portion coupled to a rear surface of the Peltier element and the other end portion extended to a side direction; and a radiating module coupled to the rear surface of one end portion of the heat pipe and a radiating fan arranged at a rear of the radiating module.

The heat pipe may be configured of one end portion having a flat shape and the other end portion bent to the rear.

The radiating module may be formed to be longer than the Peltier element, and one end portion of the heat pipe may be formed to have a length corresponding to the radiating module.

The Peltier element may be closely adhered to an end of one end portion of the heat pipe.

The radiating fan may be disposed at the side and rear of the radiating module to face the other end portion of the heat pipe.

The heat pipe may have one end portion coupled to the Peltier element, have a central portion closely adhered to the rear surface of the radiating module as a flat shape after being bent to be coupled to the rear surface of the radiating module, and have the other end portion extended to the side.

The heat pipe may have the other end portion to which a condensation pin is coupled.

The heat exchanger may have a front coupled to an outer side of the holder body so as to cover the blowing hole, an inlet formed at one side thereof, and a heat transferring pin formed therein to thereby allow the wind introduced into the inlet to be heat-exchanged by the heat transferring pin and to be then discharged into the holder body through the blowing hole.

The heating and cooling cup holder may further include an external holder formed to have a diameter greater than that of the holder body and forming a ventilation space between the external holder and the holder body as a shape enclosing the side of the holder body.

The heating and cooling cup holder may further include a blower provided in the ventilation space to inhale air in the ventilation space and having an outlet connected to the inlet of the heat exchanger.

The heat exchanger may be coupled to the holder body so that the inlet is formed at one side of the heat exchanger and the blowing hole is disposed at the other end portion thereof.

The holder body, the heat exchanger, the Peltier element, the heat pipe, the radiating module, and the radiating fan may be provided in an armrest of a vehicle.

The present methods and apparatuses have other features and advantages apparent from the accompanying drawings, incorporated herein, and below Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
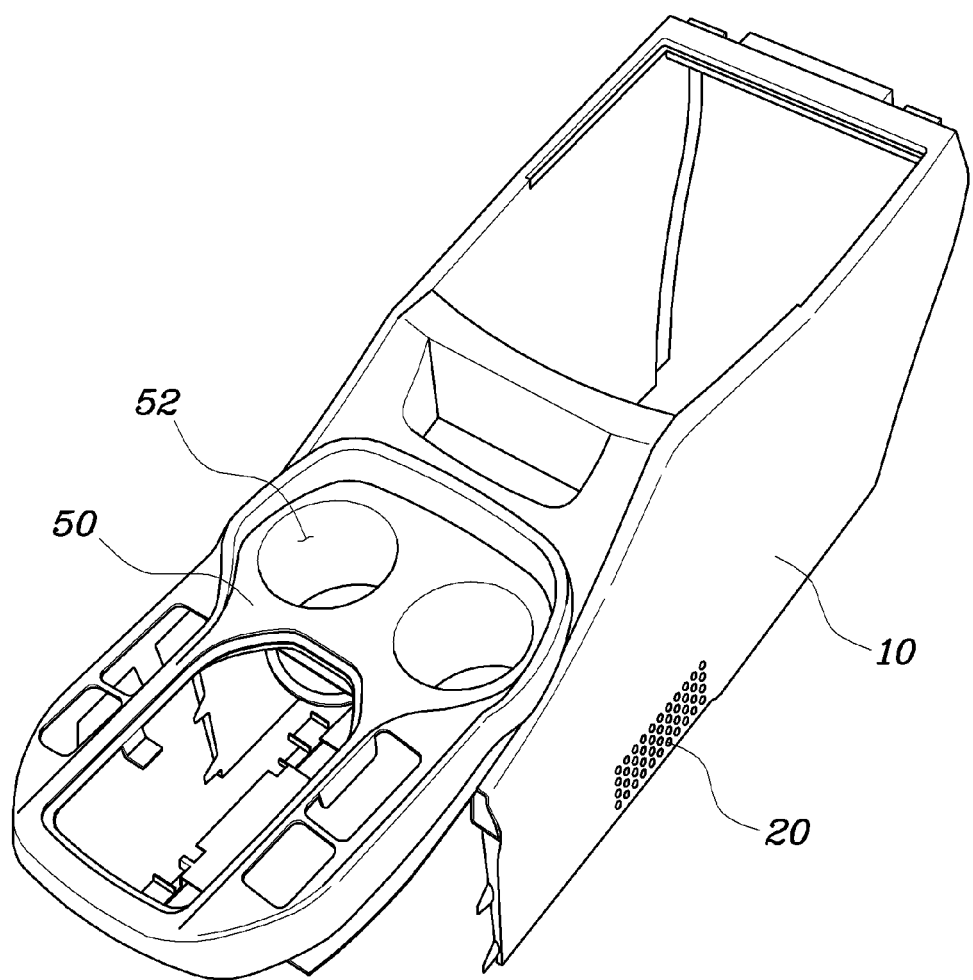
FIG. 1 is a perspective view of an exemplary heating and cooling cup holder installed in an armrest according to the present invention.
Figure 2:
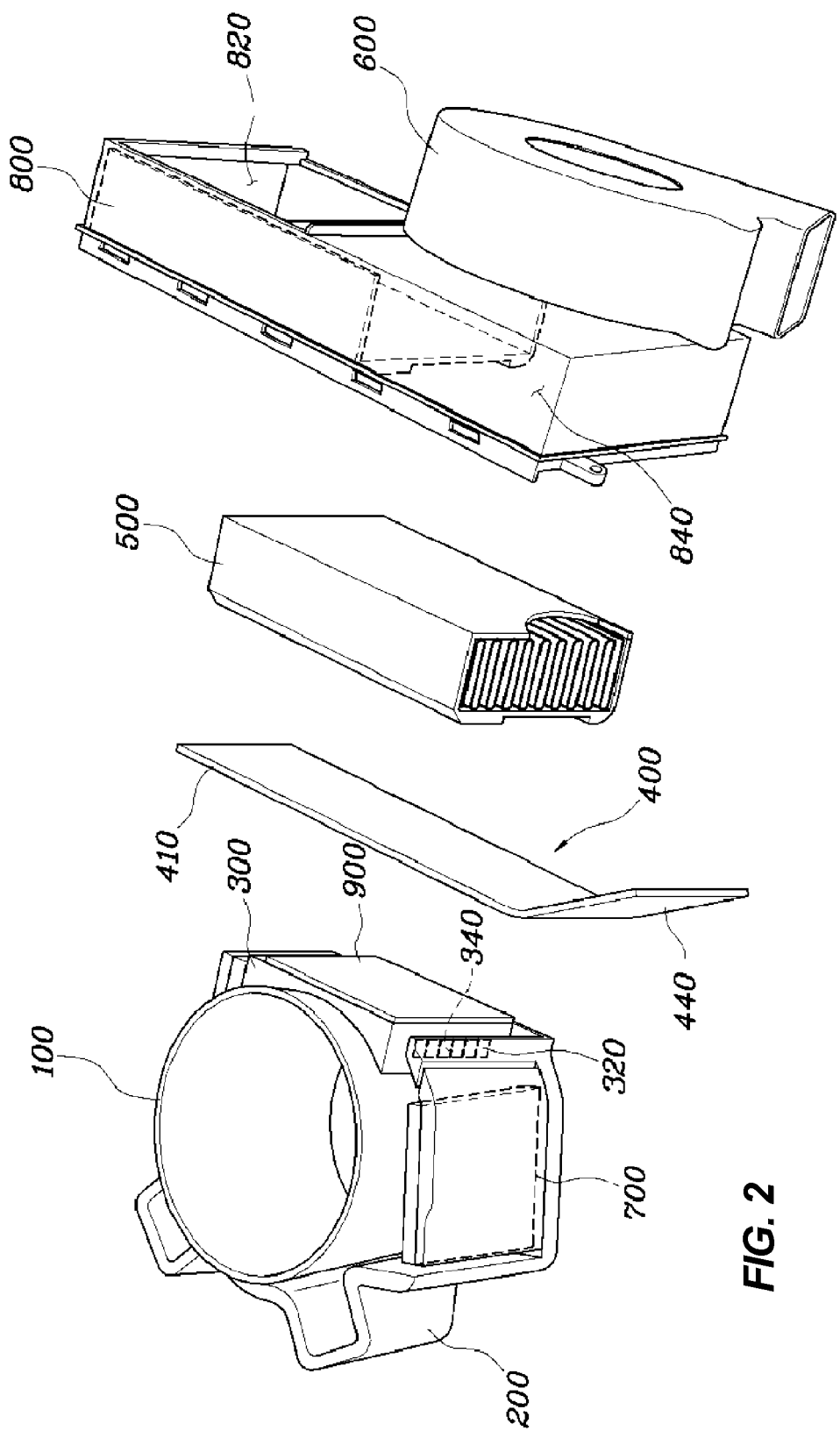
FIG. 2 is an exploded perspective view of the exemplary heating and cooling cup holder according to the present invention.
Figure 3:
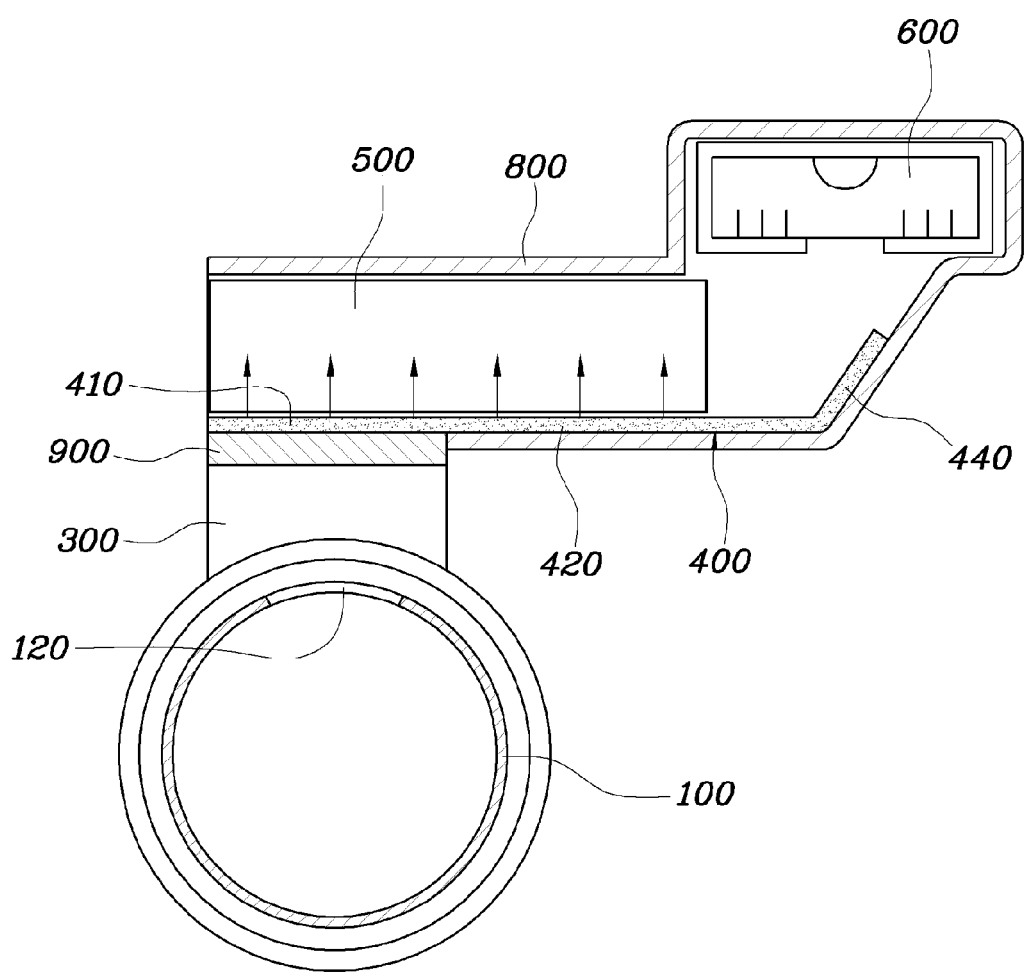
FIG. 3 is a cross-sectional view showing schematically an exemplary heating and cooling cup holder according to the present invention.
Figure 4:
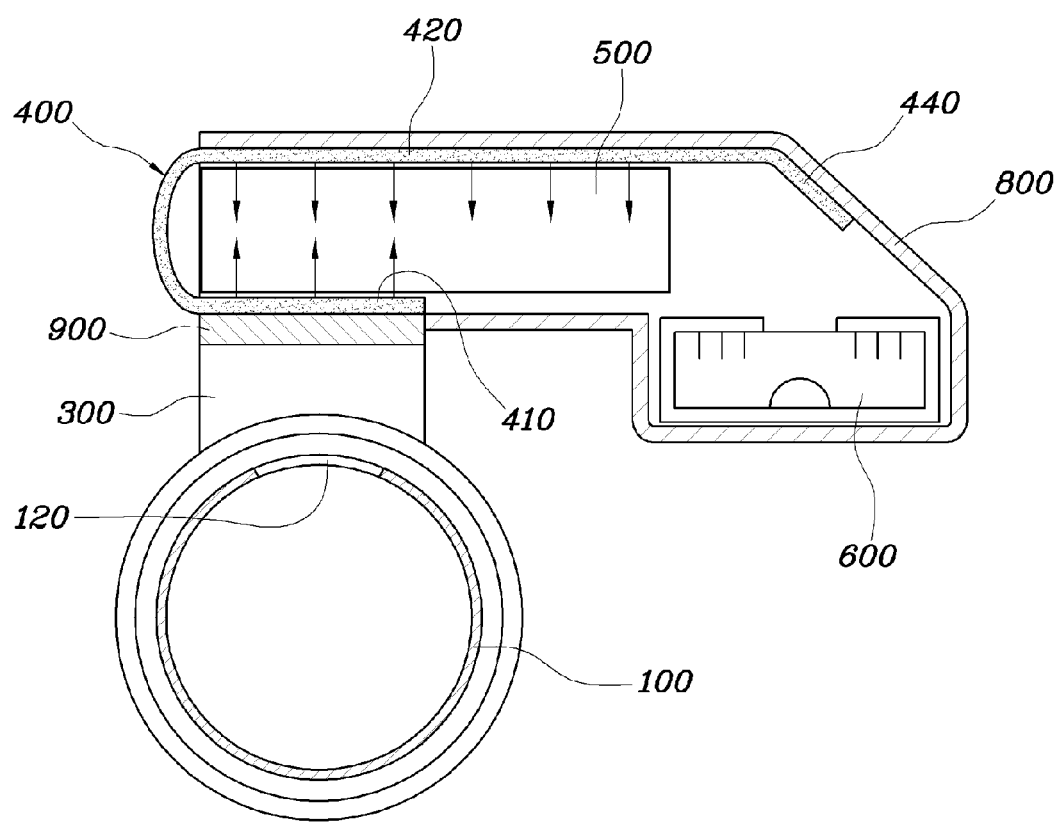
FIG. 4 is a cross-sectional view showing schematically an exemplary heating and cooling cup holder according to the present invention.
Figure 5:
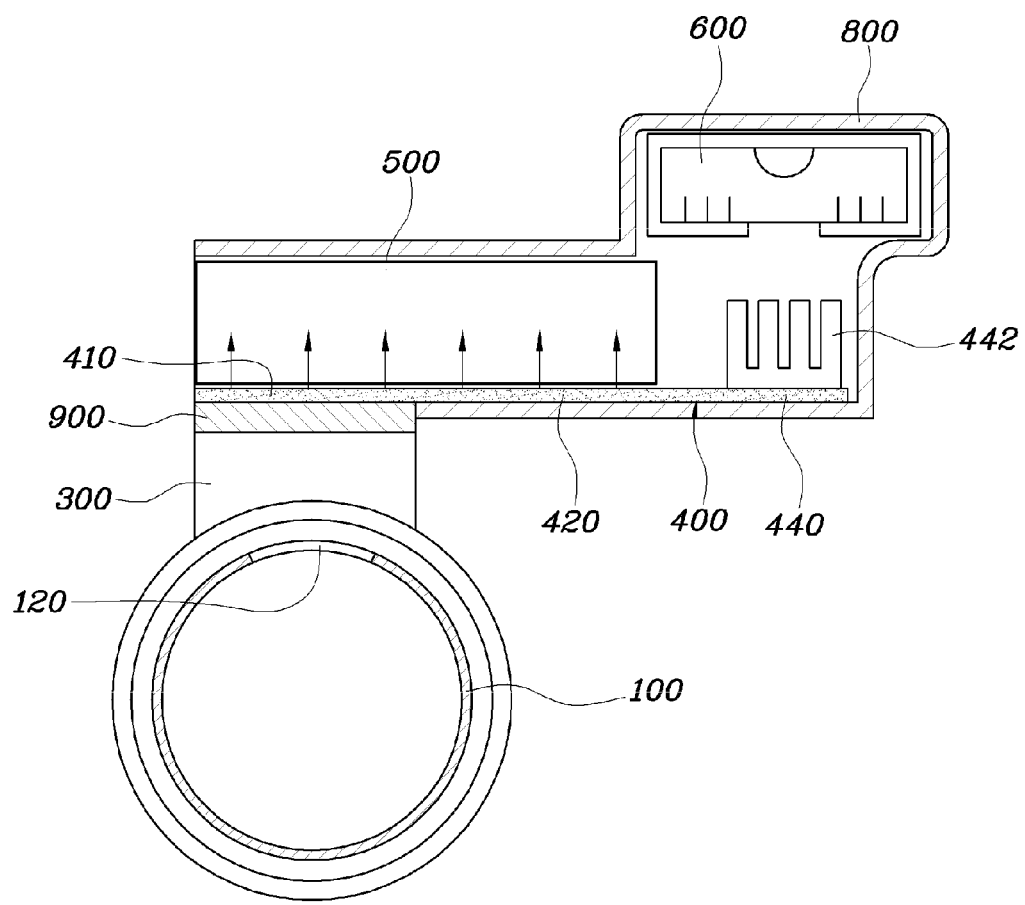
FIG. 5 is a cross-sectional view showing schematically an exemplary heating and cooling cup holder according to the present invention.
Figure 6:
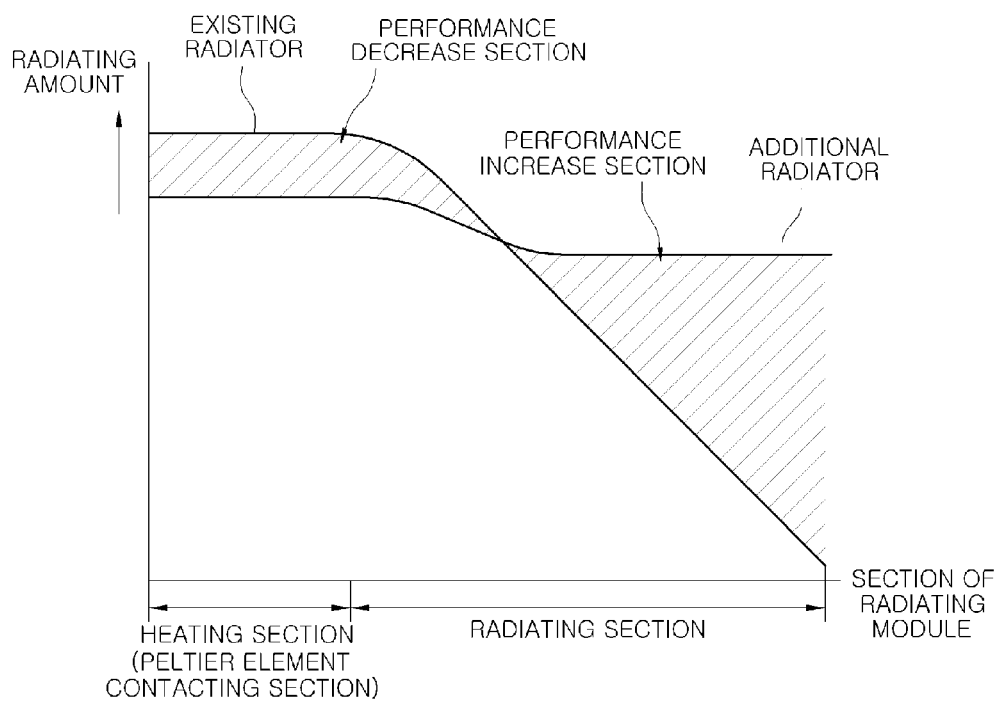
FIG. 6 is a graph comparing performance of an exemplary heating and cooling cup holder according to the present invention.

FIG. 1 is a perspective view of a heating and cooling cup holder installed in an armrest according to various embodiments of the present invention, FIG. 2 is an exploded perspective view of the heating and cooling cup holder according to various embodiments of the present invention, FIGS. 3 to 5 are views showing heating and cooling cup holders according to various embodiments of the present invention, and FIG. 6 is a graph comparing performance of the heating and cooling cup holder according to various embodiments of the present invention.

First, FIG. 1 is a perspective view of a heating and cooling cup holder installed in an armrest 10 according to various embodiments of the present invention, where the heating and cooling cup holder according to various embodiments of the present invention may be installed in the armrest 10 of a vehicle. To this end, the armrest 10 is provided with a cup holder cover 50, a cup is stored into a top 52 of the cover 50, and the cup holder according to the present invention is installed below the cover.

FIG. 2 is a perspective view of the heating and cooling cup holder according to various embodiments of the present invention, that is, FIG. 2 is an exploded perspective view of the heating and cooling cup holder according to various embodiments of the present invention.

The heating and cooling cup holder according to the present invention may include a holder body 100 having a top opened to receive a beverage container, a shape enclosing the beverage container, and a blowing hole 120 to which wind is introduced, formed at a side thereof; a heat exchanger 300 having a front or inner surface coupled to an outer side of the holder body 100 so as to cover the blowing hole 120, that is, having a front or inner surface mounted at the blowing hole 120, an inlet 320 formed at one side thereof, and a heat transferring pin 340 formed therein to thereby allow the wind introduced into the inlet 320 to be heat-exchanged by the heat transferring pin 340 and to be then discharged into the holder body 100 through the blowing hole 120; a Peltier element 900 having a front coupled to a rear or outer surface of the heat exchanger 300 and a heat pipe 400 having a front of one end, that is, a first end portion 410 coupled to a rear surface of the Peltier element 900 and the other end, that is, a second end portion 440 extended to a side direction; a radiating module 500 coupled to the rear surface of one end portion 410 of the heat pipe 400 and a radiating fan 600 arranged at a rear of the radiating module 500; an external holder 200 formed to have a diameter greater than that of the holder body 100 and forming a ventilation space between the external holder 200 and the holder body 100 as a shape enclosing the side of the holder body 100; and a blower 700 provided in the ventilation space to inhale air in the ventilation space and having an outlet connected to the inlet 320 of the heat exchanger 300.

The holder body 100 may be formed of a metal material capable of conducting heat, and simultaneously performs convection and conduction by the above mentioned metal material. The holder body 100 has a top opened to receive a beverage container, a shape at least partially enclosing the beverage container, and a blowing hole 120 to which wind is introduced, formed at a side thereof. The conditioned air introduced through the blowing hole 120 bumps a cup C, is upwardly raised, and is again introduced into the blower 700.

In addition, the heat exchanger 300 has a front coupled to an outer side of the holder body 100 so as to cover the blowing hole 120. The heat exchanger 300 has an inlet 320 formed at one side thereof to thereby introduce the air, and a heat transferring pin 340 formed therein to thereby allow the wind introduced into the inlet to be heat-exchanged by the heat transferring pin 340. In addition, the heat-exchanged wind is discharged into the holder body 100 through the blowing hole 120 to perform convective heat transfer toward the cup C side.

In addition, the Peltier element 900 has a front coupled to the rear surface of the heat exchanger 300 to thereby directly cool or heat the heat exchanger 300. Therefore, the air introduced into the heat exchanger 300 to thereby be discharged into the holder body 100 is conditioned. In addition, simultaneously, since the heat exchanger 300 is directly coupled to the holder body 100, it cools or heats all of the holder body 100 to thereby perform heat transfer by conduction with the cup C, and the air between the holder body 100 and the cup C may perform the convective heat transfer with better excellent efficiency due to the conduction of the holder body 100.

The heat pipe 400 has a front of one end portion 410 coupled to a rear surface of the Peltier element 900 and the other end portion 440 extended to a side direction. In addition, a radiating module 500 is coupled to a rear surface of one end portion 410 of the heat pipe 400 and a radiating fan 600 is arranged at a rear of the radiating module 500. The heat pipe 400 and the radiating module 500 may be embedded to be integrated in one housing 800. In addition, the housing 800 may have a section which is classified into a section 820 in which the radiating module 500 is disposed and a section 840 in which the other end portion 440 of the heat pipe 400 is disposed and to which the radiating fan 600 is connected.

Therefore, evaporation is generated at one end portion 410 of the heat pipe 400, such that waste heat of the Peltier element 900 is rapidly moved and the heat is transferred to the radiating module 500, and a condensation process is generated at the other end portion 440 of the heat pipe 400, such that the heat transfer of the heat pipe 400 is performed.

In addition, as a result, a radiating area wider than a case in which the Peltier element 900 is directly coupled to the radiating module 500 without having the heat pipe 400 may be used.

Meanwhile, the radiating fan 600 is arranged at the rear of the radiating module 500 to inhale and discharge the air, thereby allowing the radiation by convection to be generated at the radiating module 500.

As shown in FIG. 3, the heat pipe 400 may be configured of one end portion 410 having a flat shape and the other end portion 440 bent to the rear. The radiating module 500 may be formed to be longer than the Peltier element 900, and one end portion 410 of the heat pipe 400 may be formed to have a length corresponding to the radiating module 500. In addition, the Peltier element 900 may be closely adhered to an end of one end portion 410 of the heat pipe 400.

By the configuration described above, the end of one end portion 410 of the heat pipe 400 receives the heat, moves the received heat to the other end portion 440 side, and uniformly transfers the heat to the radiating module 500, and the condensation is generated at the other end portion 440. In addition, the radiating fan 600 is disposed at the side and rear of the radiating module 500 to face the other end portion 440 of the heat pipe 400, thereby making it possible to allow the condensation process to be more easily generated. Since the other end portion 440 has a shape which is somewhat bent to the radiating fan 600 side, it may serve to guide the wind and allow the condensation to be more effectively generated.

Meanwhile, as shown in FIG. 4, the heat pipe 400 may have one end portion 410 coupled to the Peltier element 900, may have a central portion 420 closely adhered to the rear surface of the radiating module 500 as a flat shape after being bent to be coupled to the rear surface of the radiating module 500, and may have the other end portion 440 extended to the side.

In addition, as shown in FIG. 5, a condensation pin 442 may be coupled to the other end portion 440 of the heat pipe 400.

FIG. 6 is a graph comparing performance of the heating and cooling cup holder according to various embodiments of the present invention, and in an existing radiator, the Peltier element is directly coupled to the radiating module without having the heat pipe. In this case, it may be appreciated that a radiating amount is significantly decreased as outwardly going out of a heating section in which the radiating module contacts the Peltier element. That is, radiating efficiency is decreased. However, according to various embodiments of the present invention, since the heat pipe transfers the heat, the heat is received in the heating section as well as in the radiating section in the radiating module, such that the radiating area is significantly increased, thereby increasing the radiating amount.

Meanwhile, as shown in FIG. 2, the external holder 200 is formed to have a diameter greater than that of the holder body 100 and forms a ventilation space between the external holder 200 and the holder body 100 as a shape enclosing the side of the holder body 100. In addition, a blower 700 is provided in the ventilation space to inhale air in the ventilation space and has an outlet connected to the inlet of the heat exchanger 300 to thereby supply the inhaled air to the heat exchanger 300.

Therefore, the air between the cup C and the holder body 100 goes from an inner side to an outer side through the top of the holder body 100 and is again introduced between the holder body 100 and the external holder 200, thereby being transferred to the heat exchanger 300 through the blower 700. In addition, the heat exchanger 300 again conditions the transferred air to thereby re-introduce between the holder body 100 and the cup C through the blowing hole 120. At the same time, the heat exchanger 300 directly conducts the holder body 100, such that the heating and cooling of the cup may be performed by the convective heat transfer and conduction and the conducted air is continuously re-circulated and conditioned, thereby increasing conditioning efficiency and rapid action property. This is ultimately possible since the Peltier element 900 cools and heats the heat exchanger 300, and an opposite surface of the Peltier element 900 is radiated to the radiating module through the heat pipe, thereby making it possible to allow the cup holder to be stably operated.

According to the heating and cooling cup holder having the structure described above, in keeping, cooling, and heating the beverage container into the heating or cooling state, the radiating capability of the external radiator is maximized, such that the performance of the heating and cooling cup holder may be maximized as compared to the existing refrigerator and the area of the radiator may be reduced and the radiating efficiency thereof may be improved even in the case in which the same external radiator is used.

In addition, the thermo element may be miniaturized and the radiator area may be minimized, such that the range in which the heating and cooling cup holder is mounted in the vehicle may be expanded, and energy efficiency and control function may be improved.

In addition, convenience for the user may be increased by improving rapid action property and performance, and marketability may also be increased because the beverage container may be cooled or heated in a short time to drink in the car.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heating and cooling cup holder, comprising:
   a holder body having a top opened to receive a beverage container and shaped to at least partially enclose the beverage container, and a blowing hole formed at a side of the holder body through which air flows into the holder body;
   a heat exchanger including an inner surface mounted at the blowing hole and an inlet formed at one side of the heat exchanger, wherein air flowing into the inlet is heat-exchanged and discharged through the blowing hole into the holder body;
   a Peltier element including a front surface coupled to an outer surface of the heat exchanger;

a heat pipe including a first end portion having a front surface coupled to a rear surface of the Peltier element, and a second end portion extending away from the Peltier element in a side direction of the Peltier element; and a radiating module coupled to a rear surface of the first end portion of the heat pipe; and a radiating fan arranged at a rear of the radiating module away from the heat pipe, wherein the heat exchanger has a front coupled to an outer side of the holder body so as to cover the blowing hole, an inlet formed at one side of the heat exchanger, and a heat transferring pin formed in the heat exchanger to allow air passing through the inlet to be heat-exchanged by the heat transferring pin and then discharged into the holder body through the blowing hole.

2. The heating and cooling cup holder according to claim 1, wherein one of the first and second end portions of the heat pipe is flat shape and the other of the first and second end portions is bent to the rear of the Peltier element.

3. The heating and cooling cup holder according to claim 1, wherein the radiating module is longer than the Peltier element, and the first end portion of the heat pipe has a length corresponding to the radiating module.

4. The heating and cooling cup holder according to claim 3, wherein the Peltier element is closely adhered to the first end portion of the heat pipe.

5. The heating and cooling cup holder according to claim 1, wherein the radiating fan is disposed to one side and the rear of the radiating module to face the second end portion of the heat pipe.

6. The heating and cooling cup holder according to claim 1, wherein the first end portion of the heat pipe is coupled to the Peltier element, and a central portion of the heat pipe is adhered to the radiating module.

7. The heating and cooling cup holder according to claim 1, wherein a condensation pin is coupled to the second end of the heat pipe.

8. The heating and cooling cup holder according to claim 1, further comprising an external holder including a diameter greater than that of the holder body and forming a ventilation space between the external holder and the holder body.

9. The heating and cooling cup holder according to claim 8, further comprising a blower provided in the ventilation space to draw air into the ventilation space and having an outlet connected to the inlet of the heat exchanger.

10. The heating and cooling cup holder according to claim 1, wherein the heat exchanger is coupled to the holder body so that the inlet is formed at one side of the heat exchanger and the blowing hole is disposed at an opposing end of the heat exchanger.

11. The heating and cooling cup holder according to claim 1, wherein the holder body, the heat exchanger, the Peltier element, the heat pipe, the radiating module, and the radiating fan are provided in an armrest of a vehicle.

* * * * *